United States Patent
Motomura

(10) Patent No.: US 9,228,116 B2
(45) Date of Patent: Jan. 5, 2016

(54) THERMOSETTING RESIN COMPOSITION, THERMOSETTING ADHESIVE SHEET, AND METHOD OF PRODUCING THERMOSETTING ADHESIVE SHEET

(71) Applicant: DEXERIALS CORPORATION, Tokyo (JP)

(72) Inventor: Daisuke Motomura, Utsunomiya (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/398,607

(22) PCT Filed: May 28, 2013

(86) PCT No.: PCT/JP2013/064721
§ 371 (c)(1),
(2) Date: Nov. 3, 2014

(87) PCT Pub. No.: WO2013/183486
PCT Pub. Date: Dec. 12, 2013

(65) Prior Publication Data
US 2015/0111035 A1     Apr. 23, 2015

(30) Foreign Application Priority Data

Jun. 6, 2012   (JP) ................. 2012-129388

(51) Int. Cl.
| | | |
|---|---|---|
| B32B 27/38 | (2006.01) |
| B05D 5/10 | (2006.01) |
| C09J 133/06 | (2006.01) |
| C09J 163/00 | (2006.01) |
| C08G 59/32 | (2006.01) |
| C08G 59/38 | (2006.01) |
| C08G 59/56 | (2006.01) |
| C08G 59/66 | (2006.01) |
| C09J 7/02 | (2006.01) |
| C08K 5/00 | (2006.01) |
| C08K 5/25 | (2006.01) |
| C08K 5/37 | (2006.01) |
| C09J 133/08 | (2006.01) |

(52) U.S. Cl.
CPC . *C09J 7/02* (2013.01); *C08G 59/56* (2013.01); *C08G 59/66* (2013.01); *C09J 7/0203* (2013.01); *C09J 133/068* (2013.01); *C09J 163/00* (2013.01); *C08K 5/0025* (2013.01); *C08K 5/25* (2013.01); *C08K 5/37* (2013.01); *C09J 133/08* (2013.01); *C09J 2205/102* (2013.01); *C09J 2433/00* (2013.01); *C09J 2463/00* (2013.01)

(58) Field of Classification Search
None
See application file for complete search history.

(56) References Cited

U.S. PATENT DOCUMENTS 5,214,098 A * 5/1993 Setiabudi et al. ...... C08G 59/50
                                                              428/413

FOREIGN PATENT DOCUMENTS

| JP | A-62-85941 | 4/1987 |
| JP | A-04-370996 | 12/1992 |
| JP | A-11-106731 | 4/1999 |
| JP | A-2001-40276 | 2/2001 |
| JP | A-2002-348557 | 12/2002 |
| JP | A-2004-197003 | 7/2004 |
| JP | A-2011-79959 | 4/2011 |

OTHER PUBLICATIONS

International Search Report issued in PCT/JP2013/064721 mailed Aug. 13, 2013 (with translation).

* cited by examiner

Primary Examiner — Michael J Feely
(74) Attorney, Agent, or Firm — Oliff PLC

(57) ABSTRACT

A thermosetting resin composition has good storage properties at room temperature and an unreacted epoxy resin etc. are less likely to exude therefrom during heat compression molding. The thermosetting resin composition contains an acrylic copolymer including an epoxy group-containing (meth)acrylate unit, an epoxy resin, and a curing agent for an epoxy resin. In this thermosetting resin composition, epoxy groups in at least the acrylic copolymer are partially cross-linked with an amine compound and a thiol compound having 2 to 4 thiol groups per molecule, and the curing agent for an epoxy resin is an organic acid dihydrazide.

8 Claims, 2 Drawing Sheets

THERMOSETTING RESIN COMPOSITION, THERMOSETTING ADHESIVE SHEET, AND METHOD OF PRODUCING THERMOSETTING ADHESIVE SHEET

TECHNICAL FIELD

The present invention relates to a thermosetting resin composition containing an acrylic copolymer, an epoxy resin, and a curing agent for an epoxy resin, a thermosetting adhesive sheet, and a method of producing the thermosetting adhesive sheet.

BACKGROUND ART

An adhesive used for applications of flexible printed circuit (hereinafter referred to as an "FPC") boards contains, as a curable component, a mixture of an epoxy resin and a curing agent for an epoxy resin. The adhesive further contains, for example, acrylonitrile-butadiene rubber (or Nitril-Butaadiene Rubber, hereinafter referred to as "NBR") in order to improve the peel strength of the adhesive and to impart flexibility to the adhesive. Nitrile rubber including carboxyl groups crosslinkable with an epoxy resin is widely used as the above NBR in order to obtain favorable soldering heat resistance (see Patent Literature 1).

The adhesive composition used for the FPC applications contains a large amount of epoxy resin, and this causes a problem in that a large amount of unreacted epoxy resin etc. exudes during thermal compression molding and clogs openings provided in a cover lay, a reinforcing plate, etc.

Patent Literature 2 proposes a method for preventing exudation of an adhesive composition through openings by adding an ultraviolet (UV) curable resin to the adhesive composition and applying ultraviolet rays to the openings to cure the ultraviolet curable resin.

However, in the technique described in Patent Literature 2, the step of applying ultraviolet rays is additionally provided. Therefore, capital investment for the UV application step and special storage conditions for avoiding UV rays during storage are necessary.

Accordingly, to improve the storage conditions, the applicant used a thermosetting resin composition containing a prescribed acrylic copolymer, an epoxy resin, and a curing agent for an epoxy resin (Patent Literature 3). More specifically, the applicant used, as the curing agent, an organic acid dihydrazide having a prescribed particle diameter.

CITATION LIST

Patent Literature

Patent Literature 1: Japanese Patent Application Laid-Open No. Hei. 04-370996
Patent Literature 2: Japanese Patent Application Laid-Open No. Sho. 62-85941
Patent Literature 3: Japanese Patent Application Laid-Open No. 2011-079959

SUMMARY OF INVENTION

Technical Problem

The present invention has been proposed to further improve the above conventional technique, and it is an object to provide a thermosetting resin composition which has good storage properties at room temperature and from which an unreacted epoxy resin etc. are less likely to exude during heat compression molding and to provide a thermosetting adhesive sheet and a method of producing the thermosetting adhesive sheet.

Solution to Problem

A thermosetting resin composition according to the present invention includes an acrylic copolymer including an epoxy group-containing (meth)acrylate unit, an epoxy resin, and a curing agent for an epoxy resin, wherein epoxy groups in at least the acrylic copolymer are partially cross-linked with an amine compound and a thiol compound having 2 to 4 thiol groups per molecule, and the curing agent for an epoxy resin is an organic acid dihydrazide.

A thermosetting adhesive sheet according to the present invention comprises a base film and a thermosetting adhesive layer formed on the base film and made of the above thermosetting resin composition.

A first method of producing the thermosetting adhesive sheet includes:
a cross-linking step of mixing an acrylic copolymer including an epoxy group-containing (meth)acrylate unit, a thiol compound having 2 to 4 thiol groups per molecule, an amine compound, and an organic solvent to partially cross-link epoxy groups in the acrylic copolymer with the thiol compound and the amine compound;
a coating preparation step of dissolving an epoxy resin in the organic solvent that contains the acrylic copolymer with the epoxy groups partially cross-linked and then dispersing an organic acid dihydrazide in the resultant organic solvent to thereby prepare a thermosetting adhesive layer-forming coating; and
a thermosetting adhesive layer forming step of applying the thermosetting adhesive layer-forming coating to a base film and then drying the thermosetting adhesive layer-forming coating to thereby form a thermosetting adhesive layer.

A second method of producing the thermosetting adhesive sheet includes:
a step of preparing a dispersion containing an acrylic copolymer including an epoxy group-containing (meth)acrylate unit, an epoxy resin, a thiol compound having 2 to 4 thiol groups per molecule, an amine compound, and an organic solvent, the dispersion further containing an organic acid dihydrazide dispersed therein;
a cross-linking step of partially cross-linking epoxy groups in the acrylic copolymer and the epoxy resin in the dispersion with the thiol compound and the amine compound; and
a thermosetting adhesive layer forming step of preparing a partially cross-linked product by partially cross-linking the epoxy groups in the acrylic copolymer and the epoxy resin in the dispersion to serve as a thermosetting adhesive layer-forming coating, and applying the thermosetting adhesive layer-forming coating to a base film and then drying the applied thermosetting adhesive layer-forming coating to thereby form a thermosetting adhesive layer.

Advantageous Effects of Invention

According to the thermosetting resin composition of the present invention, the epoxy groups in at least the acrylic copolymer are partially cross-linked with the thiol compound having a specific number of thiol groups. Therefore, exudation of an unreacted portion of the epoxy resin etc. during heat compression molding can be suppressed.

Among the thermosetting adhesive sheets including the thermosetting adhesive layers formed of the thermosetting resin compositions of the present invention, the thermosetting adhesive sheet produced by the first production method of the present invention has cross-links formed between epoxy groups in the acrylic copolymer, so that exudation can be suppressed. In the thermosetting adhesive sheet produced by the second production method of the present invention, epoxy groups in the acrylic copolymer and also epoxy groups in the epoxy resin form cross-links, so that the exudation can be further suppressed.

DESCRIPTION OF EMBODIMENTS

Figure 1:
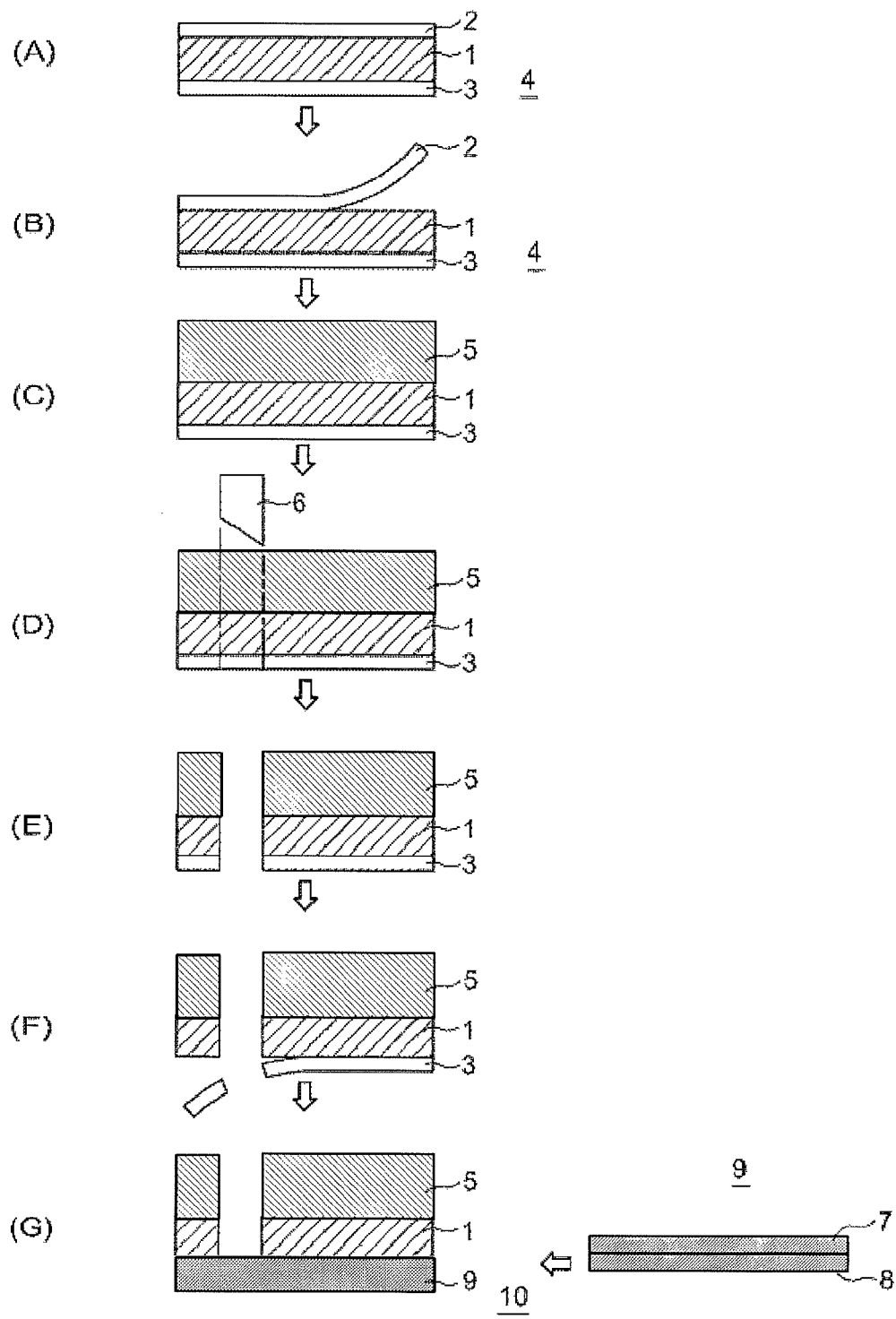
FIG. 1 is a series of process diagrams illustrating a method of producing a test piece.

Specific embodiments of a thermosetting resin composition, a thermosetting adhesive sheet, and a thermosetting adhesive sheet production method to which the present invention is applied will be described with reference to the drawings in the following order.

1. Thermosetting resin composition
1-1. Acrylic copolymer
1-2. Epoxy resin
1-3. Curing agent for epoxy resin
1-4. Thiol compound
1-5. Amine compound
2. Method of producing thermosetting resin composition
3. Thermosetting adhesive sheet
4. Method of producing thermosetting adhesive sheet
5. Other embodiments 1. Thermosetting Resin Composition A thermosetting resin composition according to this embodiment contains an acrylic copolymer including an epoxy group-containing (meth)acrylate unit, an epoxy resin, and a curing agent for an epoxy resin.

1-1. Acrylic Copolymer

The acrylic copolymer is used to provide film formability during film formation and to impart flexibility and toughness to a cured product. The acrylic copolymer is obtained, for example, by copolymerizing (a) an epoxy group-containing (meth)acrylate monomer, (b) an acrylonitrile monomer, and (c) a (meth)acrylate monomer containing no epoxy group and then partially cross-linking epoxy groups originating from (a) the epoxy group-containing (meth)acrylate monomer with a thiol compound having 2 to 4 thiol groups per molecule using an amine compound as a catalyst. These monomers (a) to (c) will next be described.

(a) Epoxy Group-Containing (Meth)acrylate Monomer

The epoxy group-containing (meth)acrylate monomer is used to form a three-dimensional cross-linked structure in a cured product of the thermosetting resin composition through a reaction with the curing agent for an epoxy resin. When the three-dimensional cross-linked structure is formed, the moisture resistance and heat resistance of the cured product are improved. For example, even when a reinforced FPC including a reinforcing resin sheet bonded and secured to the FPC with the cured product of the thermosetting resin composition is subjected to soldering treatment (for example, reflow soldering treatment) at 260° C. or higher, the occurrence of a swelling phenomenon in the bonded, secured portion caused by moisture absorption can be prevented.

The epoxy group-containing (meth)acrylate monomer used can be appropriately selected from those used for conventional acrylic-based thermosetting adhesives applied to the field of electronic parts. Examples of the epoxy group-containing (meth)acrylate monomer may include glycidyl acrylate (GA) and glycidyl methacrylate (hereinafter referred to as "GMA"). Of these, GMA is used preferably from the viewpoint of safety and availability on the market. Only one type of epoxy group-containing (meth)acrylate monomer may be used, or a combination of two or more types may be used.

If the amount of the epoxy group-containing (meth)acrylate monomer in the total amount of the monomers used to prepare the acrylic copolymer is too small, heat resistance tends to deteriorate. If the amount is too large, peel strength tends to deteriorate. Therefore, the amount of the epoxy group-containing (meth)acrylate monomer is preferably 3 to 15% by mass.

(b) Acrylonitrile Monomer

The acrylonitrile monomer is used to improve heat resistance. Examples of the acrylonitrile monomer may include acrylonitrile and methacrylonitrile. Only one type of acrylonitrile monomer may be used, or a combination of two or more types may be used.

If the amount of the acrylonitrile monomer in the total amount of the monomers used to prepare the acrylic copolymer is too small, heat resistance deteriorates. If the amount is too large, the acrylic copolymer does not easily dissolve in a solvent. Therefore, the amount of the acrylonitrile monomer is preferably 20 to 35% by mass and more preferably 25 to 30% by mass.

(c) (Meth)acrylate Monomer Containing No Epoxy Group

The (meth)acrylate monomer containing no epoxy group can be appropriately selected from those used for conventional acrylic-based thermosetting adhesives applied to the field of electronic parts. Examples of the (meth)acrylate monomer containing no epoxy group may include methyl acrylate (MA), ethyl acrylate (EA), n-propyl acrylate, n-butyl acrylate, i-butyl acrylate, n-hexyl acrylate, n-octyl acrylate, i-octyl acrylate, 2-ethylhexyl acrylate, i-nonyl acrylate, stearyl acrylate, methyl methacrylate, ethyl methacrylate, n-butyl methacrylate, i-butyl methacrylate, n-hexyl methacrylate, n-octyl methacrylate, i-octyl methacrylate, 2-ethylhexyl methacrylate, i-nonyl methacrylate, n-dodecyl methacrylate, i-dodecyl methacrylate, and stearyl methacrylate. Of these, butyl acrylate and ethyl acrylate are used preferably. Only one type of (meth)acrylate monomer containing no epoxy group may be used, or a combination of two or more types may be used.

If the amount of the monomer containing no epoxy group in the total amount of the monomers used to prepare the acrylic copolymer is too small, basic characteristics tend to deteriorate. If the amount is too large, heat resistance tends to deteriorate. Therefore, the amount of the monomer containing no epoxy group is 60 to 75% by mass and more preferably 65 to 70% by mass.

Weight Average Molecular Weight

If the weight average molecular weight of the acrylic copolymer is too small, peel strength and heat resistance tend to deteriorate. If the weight average molecular weight is too larger, solution viscosity tends to increase, and this causes deterioration of application properties. Therefore, the weight average molecular weight of the acrylic copolymer is preferably 500,000 to 700,000 and more preferably 550,000 to 650,000.

1-2. Epoxy Resin

The epoxy resin constituting the thermosetting resin composition forms a three-dimensional network structure and is used to improve adhesion.

The epoxy resin used can be appropriately selected from liquid and solid epoxy resins used for conventional epoxy resin-based thermosetting adhesives applied to the field of electronic parts. Examples of such epoxy resins may include bisphenol A-type epoxy resins, bisphenol F-type epoxy resins, bisphenol AD-type epoxy resins, hydrogenated bisphenol A-type epoxy resins, phenol novolac-type epoxy resins, cresol novolac-type epoxy resins, polyalkylene polyols (such as neopentyl glycol), polyglycidyl ethers, tetraglycidyl diaminodiphenylmethane, triglycidyl-p-aminophenol, triglycidyl-m-aminophenol, tetraglycidyl-m-xylenediamine, diglycidyl phthalate, diglycidyl hexahydrophthalate, diglycidyl tetrahydrophthalate, vinylcyclohexene dioxide, 3,4-epoxycyclohexylmethyl(3,4-epoxycyclohexane)carboxylate, and bis(3,4-epoxy-6-methylhexylmethyl)adipate. Only one type of such an epoxy resin may be used, or a combination of two or more types may be used.

If the amount used of the epoxy resin is too small, heat resistance tends to deteriorate. If the amount is too large, adhesion tends to deteriorate. Therefore, the amount of the epoxy resin is preferably 5 to 30 parts by mass and more preferably 5 to 20 parts by mass relative to 100 parts by mass of the acrylic copolymer.

1-3. Curing Agent for Epoxy Resin

The thermosetting resin composition contains an organic acid dihydrazide as the curing agent for an epoxy resin. The use of the organic acid dihydrazide as the curing agent for an epoxy resin can improve the storage properties at room temperature of the thermosetting resin composition that is a solid at room temperature.

Preferably, the organic acid dihydrazide used has an average particle diameter of 0.5 to 15 μm and is dispersed uniformly. If the average particle diameter of the organic acid dihydrazide is less than 0.5 μm, the particles of the organic acid dihydrazide may dissolve in an organic solvent used for the application of the thermosetting resin composition, and this may cause a reduction in storage properties at room temperature. If the average particle diameter of the organic acid dihydrazide is larger than 15 μm, the application properties of the thermosetting resin composition may deteriorate, and the organic acid dihydrazide may not be sufficiently mixed with the acrylic copolymer and the epoxy resin during heating and melting.

The organic acid dihydrazide may be appropriately selected from organic acid dihydrazides conventionally used as curing agents for epoxy resins. Examples of such organic acid dihydrazides may include oxalic acid dihydrazide, malonic acid dihydrazide, succinic acid dihydrazide, iminodiacetic acid dihydrazide, adipic acid dihydrazide, pimelic acid dihydrazide, suberic acid dihydrazide, azelaic acid dihydrazide, sebacic acid dihydrazide, dodecanediohydrazide, hexadecane dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, 2,6-naphthoic acid dihydrazide, 4,4'-bisbenzene hydrazide, 1,4-naphthoic acid dihydrazide, AMICURE VDH and AMICURE UDH (product name, manufactured by Ajinomoto Co., Inc.), citric acid trihydrazide, and 7,11-octadecadien-1,18-dicarbohydrazide. Only one type of organic acid dihydrazide may be used, or a combination of two or more types may be used. Among the above organic acid dihydrazides, adipic acid dihydrazide and 7,11-octadecadien-1,18-dicarbohydrazide are preferably used from the viewpoint of their relatively low melting point, high balance with curability, and easy availability.

If the amount used of the organic acid dihydrazide is too small, unreacted epoxy groups remain, and cross-linking is not sufficient, so that heat resistance and adhesion deteriorate. If the amount used of the organic acid dihydrazide is too large, an excessive amount of the organic acid dihydrazide remains unreacted, so that heat resistance and adhesion deteriorate. Therefore, the amount used of the organic acid dihydrazide is preferably 2 to 15 parts by mass relative to 100 parts by mass of the total of the acrylic copolymer and the epoxy resin.

1-4. Thiol Compound

The thiol compound is used to partially cross-link epoxy groups in the acrylic copolymer constituting the thermosetting resin composition and also to partially cross-link epoxy groups in the epoxy resin. By partially cross-linking the epoxy groups in the acrylic copolymer in the thermosetting resin composition or the epoxy groups in the acrylic copolymer and the epoxy resin, exudation of the unreacted portion of the epoxy resin etc. during heat compression molding of the thermosetting resin composition can be favorably suppressed.

The thiol compound has 2 to 4 thiol groups per molecule. When the number of thiol groups per molecule is one, the effect of addition of the thiol compound is low. When the number of thiol groups is 5 or more, cross-linking of the epoxy groups proceeds excessively. This is not preferred because the storage properties at room temperature of the thermosetting resin composition are likely to decrease.

Specific examples of the thiol compound having 2 to 4 thiol groups per molecule may include bismuthiol, 2,4,6,-trimercapto-1,3,5-triazine, 2-ethylhexyl-3-mercaptopropionate, pentaerythritol tetrakis(3-mercaptopropionate), pentaerythritol tetrakis(3-mercaptobutyrate), dipentaerythritol hexakis(3-mercaptopropionate), and trimethylolpropane tris(3-mercaptopropionate). Of these, pentaerythritol tetrakis(3-mercaptopropionate) having 4 thiol groups per molecule is preferred because exudation is less likely to occur and high film storage properties are achieved.

The amount used of the thiol compound is preferably 0.4 to 2.0 parts by mass relative to 100 parts by mass of the total of the acrylic copolymer and the epoxy resin.

1-5. Amine Compound

The amine compound is used as a catalyst for the partial cross-linking reaction of epoxy groups described above.

The amine compound used may be any of polyamines and polyamidoamines that have at least one of primary to tertiary amino groups. When a polyamine or polyamidoamine having at least one of primary and secondary amino groups is used, the polyamine or polyamidoamine used is preferably in liquid form, from the viewpoint that the epoxy resin is cured at room temperature. Examples include aliphatic polyamines such as chain aliphatic polyamines and cyclic aliphatic polyamines. Examples of the chain aliphatic polyamines may include diethylenetriamine, triethylene polyamine, tetraethylenepentamine, triethylenetetramine, dipropylenediamine, and diethylaminopropylamine. Examples of the cyclic aliphatic polyamines may include menthenediamine and isophoronediamine. When a polyamine or polyamidoamine having a tertiary amino group is used, the rate of reaction during cross-linking is fast, so that the effect of shortening heat molding time is obtained.

The amount used of the amine compound is preferably 0.05 to 0.30 parts by mass relative to 100 parts by mass of the total amount of the acrylic copolymer and the epoxy resin.

In the thermosetting resin composition according to this embodiment, preferably 1% or more, more preferably 1 to 15%, still more preferably 3 to 12% of the epoxy groups in the acrylic copolymer and the epoxy resin are cross-linked with the thiol compound and amine compound described above. This can prevent exudation of the unreacted portion of the epoxy resin during heat compression molding and also allows storage properties at room temperature to be maintained for a long time.

However, if the amount of cross-linked epoxy groups in the acrylic copolymer and the epoxy resin is less than 1%, exudation of the unreacted portion of the epoxy resin etc. during heat compression molding cannot be sufficiently suppressed. If the amount is more than 12%, exudation is not a problem, but the curing reaction proceeds excessively, so that the storage properties at room temperature deteriorate. It is difficult to precisely measure the ratio of cross-linked epoxy groups. However, for example, the ratio can be roughly computed by observing the amount of heat generated in DSC (Differential Scanning calorimetry) measurement.

The thermosetting resin composition according to this embodiment has high bonding strength and can therefore maintain high adhesion to polyimide films and metal films. The thermosetting resin composition according to this embodiment has high soldering heat resistance under moisture absorption, and therefore high lead-free solder reflow resistance during mounting can be obtained even at high humidity in, for example, summer.

2. Method of Producing Thermosetting Resin Composition

The thermosetting resin composition according to this embodiment can be prepared by uniformly mixing the above-described acrylic copolymer, epoxy resin, curing agent for an epoxy resin, thiol compound having a specific number of thiol groups, and amine compound using a routine method. Examples of the form of the thermosetting resin composition may include paste, film, and dispersion forms.

3. Thermosetting Adhesive Sheet

The thermosetting adhesive sheet includes, for example, a base film (a release liner) and a thermosetting adhesive layer formed thereon and made of the above-described thermosetting resin composition. Examples of the base film may include polyethylene terephthalate films and polyimide films. Preferably, in the thermosetting adhesive sheet, a thermosetting adhesive layer made of the thermosetting resin composition and having a thickness of 10 to 50 μm is formed on a base film prepared by optionally subjecting, for example, a polyethylene terephthalate film or a polyimide film to release treatment with silicone etc., from the viewpoint of storage properties and handleability during use.

4. Method of Producing Thermosetting Adhesive Sheet

The thermosetting adhesive sheet can be produced, for example, by any of the following first and second production methods.

The first production method includes a cross-linking step of cross-linking preferably 1 to 15% of the epoxy groups in the acrylic copolymer with the amine compound and the thiol compound having 2 to 4 thiol groups per molecule, a coating preparation step of preparing a coating for forming a thermosetting adhesive layer, and a thermosetting adhesive layer forming step of forming the thermosetting adhesive layer using the prepared coating.

In the cross-linking step, the acrylic copolymer containing the epoxy group-containing (meth)acrylate monomer and dissolved in an organic solvent is mixed with the thiol compound having 2 to 4 thiol groups per molecule and the amine compound.

In the coating preparation step, the epoxy resin is dissolved in the organic solvent containing the acrylic copolymer with the epoxy groups partially cross-linked, and then the organic acid dihydrazide is dispersed in the resultant organic solvent to thereby prepare a thermosetting adhesive layer-forming coating. The organic solvent used may be, for example, methyl ethyl ketone, toluene, etc. Preferably, in the coating preparation step, 70% by mass of the total organic acid dihydrazide particles are dispersed in the thermosetting adhesive layer-forming coating as solid particles at room temperature. In this case, the storage properties of the thermosetting adhesive sheet at room temperature can be improved.

In the thermosetting adhesive layer forming step, the thermosetting adhesive layer-forming coating prepared in the coating preparation step is applied to the base film to a dry thickness of 10 to 50 μm using a bar coater, a roll coater, etc. and then dried using a routine method to form a thermosetting adhesive layer. The thermosetting adhesive sheet can thereby be obtained.

The second production method for the thermosetting adhesive sheet according to the present invention is a method including a cross-linking step of cross-linking preferably 1 to 15% of the epoxy groups in the acrylic copolymer and the epoxy resin with the amine compound and the thiol compound having 2 to 4 thiol groups per molecule.

In this case, first, a dispersion is prepared which contains the acrylic copolymer, the epoxy resin, the thiol compound having 2 to 4 thiol groups per molecule, and the amine compound and further contains the organic acid dihydrazide that is used as a curing agent for an epoxy resin and dispersed in the dispersion. Next, in the cross-linking step, the epoxy groups in the acrylic copolymer and epoxy resin in the dispersion are partially cross-linked with the thiol compound and the amine compound. The dispersion after the cross-linking step, i.e., the dispersion with the epoxy groups in the acrylic copolymer and the epoxy resin partially cross-linked, is used as a thermosetting adhesive layer-forming coating, and the thermosetting adhesive layer-forming coating is applied to the base film and then dried to form a thermosetting adhesive layer. The cross-linking step may be performed on the base film.

The above-described thermosetting resin composition and thermosetting adhesive sheet can be preferably applied to, for example, the field of electronic parts. Particularly, the thermosetting adhesive sheet can be preferably applied for bonding and securing, for example, a terminal portion of an FPC to a 50 μm to 2 mm-thick reinforcing resin sheet used for backing of the FPC and made of polyethylene terephthalate, polyimide, glass epoxy, stainless steel, aluminum, etc. In this case, a reinforced FPC can be obtained in which the terminal portion of the FPC and the reinforcing resin sheet are bonded and secured to each other with the heat-cured product of the thermosetting adhesive layer of the thermosetting adhesive sheet according to this embodiment with the base film removed.

5. Other Embodiments

If necessary, the thermosetting resin composition according to this embodiment may contain, in addition to the above-described components, known additives such as a metal deactivating agent that does not facilitate dissolution of the organic acid dihydrazide, an antifoaming agent, an anticorrosive, and a dispersant within the range in which the effects of the present invention are not impaired.

EXAMPLES

Specific Examples of the present invention will next be described. However, the scope of the present invention is not limited to the following Examples.

The following compounds were prepared as raw materials of the thermosetting resin composition.

Constituent monomers of the acrylic copolymer: butyl acrylate (BA), ethyl acrylate (EA), acrylonitrile (AN), and glycidyl methacrylate (GMA)

Epoxy resin: JER828 manufactured by Mitsubishi Chemical Corporation

Curing agent for an epoxy resin: 7,11-octadecadien-1,18-dicarbohydrazide (UDH)

Thiol compounds: pentaerythritol tetrakis(3-mercaptopropionate) (X40, manufactured by Mitsubishi Chemical Corporation), dipentaerythritol hexakis(3-mercaptopropionate) (DPMP, manufactured by Sakai Chemical Industry Co., Ltd.), and 2-ethylhexyl-3-mercaptopropionate (EHMP, manufactured by Sakai Chemical Industry Co., Ltd.)

Amine compound: polyamine compound (TO-184, manufactured by Mitsubishi Chemical Corporation)

(Preparation of Thermosetting Adhesive Layer-Forming Coatings (First Production Method))

The acrylic copolymer including the above monomers (monomer composition: BA 52%, EA 13%, GMA 9%, and AN 26%), the amine compound, and one of the above thiol compounds were dissolved in an organic solvent such that the resultant solution had one of the chemical compositions shown in TABLE 1. A reaction was conducted for 2 hours under stirring using a stirrer to partially cross-link the epoxy groups in the acrylic copolymer.

Next, a prescribed amount of the epoxy resin and a prescribed amount of the curing agent for an epoxy resin were added to produce a thermosetting adhesive layer-forming coating (an adhesive solution) having one of the chemical compositions shown in TABLE 1.

In Comparative Example 1, a thiol compound was used with no amine compound used. In Comparative Example 2, the amine compound was used with no thiol compound used. In Comparative Example 3, the amine compound and a thiol compound having one thiol group per molecule were used. In Comparative Example 4, the amine compound and a thiol compound having six thiol groups per molecule were used.

(Production of Thermosetting Adhesive Sheets)

The obtained thermosetting adhesive layer-forming coatings each were applied to a release-treated polyethylene terephthalate film and dried in a drying furnace at 50 to 130° C. to form a 35 μm-thick thermosetting adhesive layer, whereby respective thermosetting adhesive sheets were produced.

TABLE 1

|  |  | Comparative Example 1 | Comparative Example 2 | Comparative Example 3 | Comparative Example 4 | Example 1 | Example 2 | Example 3 |
|---|---|---|---|---|---|---|---|---|
| Acrylic Copolymer |  | 100 | 100 | 100 | 100 | 100 | 100 | 100 |
| Epoxy Resin | JER828 | 10 | 7 | 8 | 7 | 7 | 10 | 10 |
| Curing Agent for Epoxy Resin | UDH | 14 | 14 | 13 | 13 | 14 | 14 | 13 |
| Amine Compound | TO184 | — | 0.1 | 0.1 | 0.1 | 0.1 | 0.1 | 0.07 |
| Thiol Compound (Number of Thiol Groups per Molecule) | (1 thiol group) | — | — | 1 | — | — | — | — |
|  | (4 thiol groups) | 1 | — | — | — | 1 | 1 | 1 |
|  | (6 thiol groups) | — | — | — | 1 | — | — | — |
| Exudation Properties |  | C | B | A | A | A | A | A |
| Peel Strength |  | A | A | A | C | A | A | A |
| Reflow Under Moisture Absorption |  | A | B | B | C | B | A | A |
| Storage Properties at Room Temperature |  | A | A | C | C | A | A | A |

(Note)
The units are parts by mass.

(Evaluation of Exudation Properties)

Figure 2:
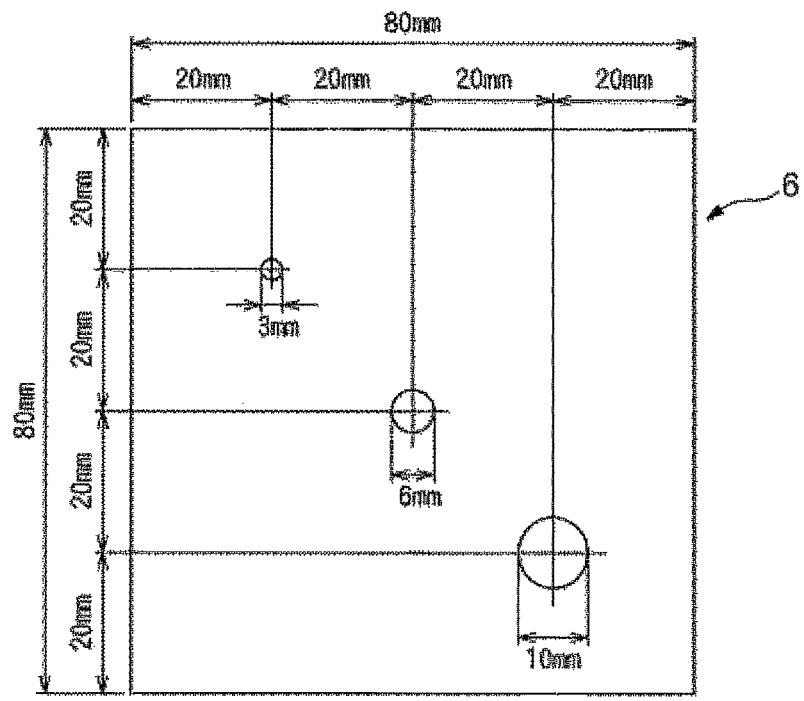
FIG. 2 is a schematic plan view illustrating an example of a thomson die used for measurement of exudation.
Figure 3:
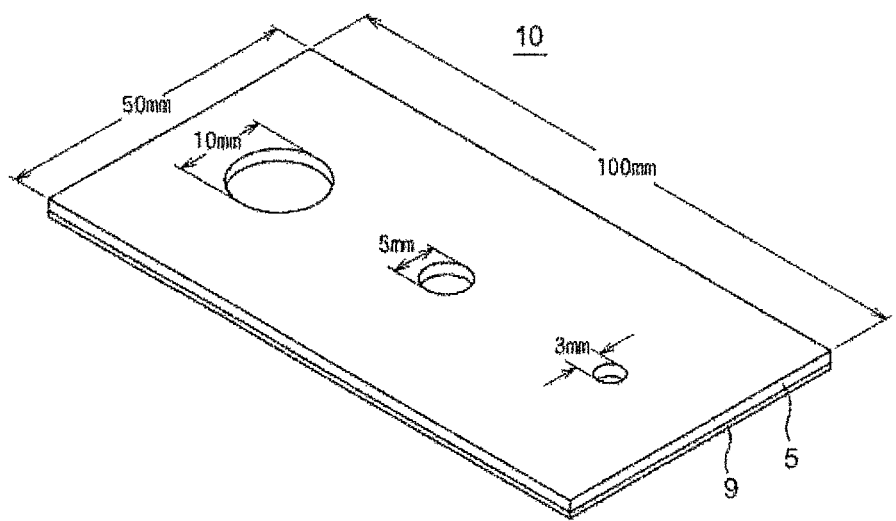
FIG. 3 is a schematic perspective view illustrating an example of a test piece for the measurement of exudation.

Exudation properties were evaluated as follows. As shown in FIG. 1(A), an adhesive sheet 4 of the double separate (double-sided release film) type was prepared, wherein an easy release-type release film (hereinafter referred to as an "easy-side film") 2 and a tight release-type release film (hereinafter referred to as a "tight-side film") 3 were provided on the surfaces of a 35 film-shaped thermosetting adhesive layer 1. The easy-side film 2 of the adhesive sheet 4 was peeled off as shown in FIG. 1(B), and a 175 μm polyimide film 5 was laminated onto the resultant adhesive sheet 4 under the conditions of 100° C., 1 m/min, and 5 kg/cm as shown in FIG. 1(C). As shown in FIGS. 1(D) and 1(E), the adhesive sheet 4 with the polyimide film 5 laminated thereon was punched through the polyimide film 5 using a thomson die 6 shown in FIG. 2. As shown in FIG. 1(F), the tight-side film 3 of the sample of the adhesive sheet 4 punched through the polyimide film 5 was peeled off, and then a CCL (copper clad laminate) 9 formed from copper 7 and a polyimide film 8 was laminated. A test piece 10 was thereby produced. As shown in FIGS. 1(G) and 3, the short sides of the test piece 10 were 50 mm, and its long sides were 100 mm. Holes having diameters of 10 mm, 5 mm, and 3 mm and used for exudation measurement were formed in the short side direction (thickness direction) of the test piece 10.

The exudation properties were measured by pressing the test piece 10 under the conditions of 170° C. and 2 MPa for one minute and then measuring the amount of exudation of the thermosetting adhesive layer 1 from the punched cross-sections after pressing under an optical microscope. The results of the measurement of exudation properties are shown in TABLE 1. In TABLE 1, a sign "A" in the exudation properties row indicates that the exudation width of the thermosetting adhesive layer 1 exuded from the holes formed in the test piece 10 was less than 100 μm. A sign "B" in the exudation properties row indicates that the exudation width of the thermosetting adhesive layer 1 exuded from the holes formed in the test piece 10 was 100 μm or more and less than 200 μm. A sign "C" indicates that the exudation width of the exuded thermosetting adhesive layer 1 was 200 μm or more.

(Evaluation of Peel Strength)

The peel strength was evaluated as follows. A thermosetting adhesive sheet immediately after production was cut into a strip having a prescribed size (5 cm×10 cm), and the thermosetting adhesive layer of the strip was temporarily affixed to a 175 μm polyimide film (175AH, manufactured by Kaneka Corporation) using a laminator with a temperature setting of 80° C. Then, the base film was removed to expose the thermosetting adhesive layer. A 50 μm-thick polyimide film (200H, manufactured by Du Pont) having the same size as the exposed thermosetting adhesive layer was laminated onto the thermosetting adhesive layer. The laminate was heated and compressed at 170° C. and a pressure of 2.0 MPa for 60 seconds and then held in an oven at 140° C. for 60 minutes.

Separately, the thermosetting adhesive layer of the thermosetting adhesive sheet cut into a strip (5 cm×10 cm) was pressed against a 0.5 mm SUS304 plate or a 1 mm-thick glass epoxy plate to temporarily affix the strip. Then the base film was removed to expose the thermosetting adhesive layer. A strip-shaped 50 μm-thick polyimide film (5 cm×10 cm) was laminated onto the exposed thermosetting adhesive layer. The laminate was heated and compressed at 170° C. and a pressure of 2.0 MPa for 60 seconds and then held in an oven at 140° C. for 60 minutes.

After the laminates were held in the oven, each polyimide film was subjected to a 90 degree peel test at a peeling rate of 50 mm/min to measure the force required to peel the polyimide film. Desirably, the peel strength is practically 10 N/cm or more. When the measurement values of the peel strength in the peel test were 10 N/cm or more, the results were evaluated as "A." When any of the measurement values of the peel strength in the peel test was less than 10 N/cm, the results were evaluated as "C." The results are shown in TABLE 1.

(Soldering Heat Resistance Test Under Moisture Absorption)

A soldering heat resistance test under moisture absorption was performed as follows. The thermosetting adhesive layer of a thermosetting adhesive sheet cut into a strip (2 cm×2 cm) was temporarily affixed to a 175 μm-thick polyimide film (APICAL 175AH, manufactured by Kaneka Corporation) using a laminator with a temperature setting of 80° C. The release liner was removed from the thermosetting adhesive sheet to expose the thermosetting adhesive layer. A 50 μm-thick polyimide film (Kapton 200H, manufactured by Du Pont) having the same size as the exposed thermosetting adhesive layer was laminated onto the thermosetting adhesive layer. The laminate was heated and compressed at 170° C. and a pressure of 2.0 MPa for 60 seconds and then held in an oven at 140° C. for 60 minutes. The heated and cured test piece was left to stand in a heat-moisture oven at 40° C. and 90 RH for 96 hours.

The test piece immediately after the heat-moisture treatment was caused to pass through a reflow furnace with top temperature set to 260° C.×30 seconds, and the presence or absence of exterior anomalies of the test piece such as swelling, exfoliation, etc. was visually inspected. The inspection results are shown in TABLE 1. In TABLE 1, a sign "A" in the row of soldering heat resistance under moisture absorption indicates that no problem was found in the exterior. A sign "B" indicates that slight swelling was observed, and a sign "C" indicates that swelling due to foaming was observed in the test piece.

(Storage Properties at Room Temperature)

The storage properties at room temperature were evaluated as follows. In TABLE 1, a sign "A" in the row of storage properties at room temperature indicates that the rate of reduction in the value of the peel strength after storage at room temperature for 6 months with respect to the initial value was 30% or less and reflow soldering properties under moisture absorption did not change. A sign "C" in the row of storage properties at room temperature indicates that the rate of reduction in the value of the peel strength with respect to the initial value was 30% or more or reflow soldering properties under moisture absorption changed.

REFERENCE SIGNS LIST 1 thermosetting adhesive layer, 2 easy-side film, 3 tight-side film, 4 adhesive sheet, 5 polyimide film, 6 thomson die, 7 copper, 8 polyimide film, 9 CCL, 10 test piece

The invention claimed is:

1. A thermosetting resin composition comprising an acrylic copolymer including an epoxy group-containing (meth)acrylate unit, an epoxy resin, and a curing agent for an epoxy resin, wherein
    epoxy groups in at least the acrylic copolymer are partially cross-linked with an amine compound and a thiol compound having 2 to 4 thiol groups per molecule, and
    the curing agent for an epoxy resin is an organic acid dihydrazide.

2. The thermosetting resin composition according to claim 1, wherein the epoxy groups in the acrylic copolymer and the epoxy groups in the epoxy resin are partially cross-linked.

3. The thermosetting resin composition according to claim 1, wherein the thiol compound has 4 thiol groups per molecule.

4. The thermosetting resin composition according to claim 1, is wherein 3 to 12% of the epoxy groups in the acrylic copolymer and the epoxy groups in the epoxy resin are cross-linked.

5. The thermosetting resin composition according to claim 1, wherein the organic acid dihydrazide serving as the curing agent for an epoxy resin has an average particle diameter of 0.5 to 15 μm.

6. A thermosetting adhesive sheet comprising a base film and a thermosetting adhesive layer made of the thermosetting resin composition according to claim 1, formed on the base film.

7. A method of producing the thermosetting adhesive sheet, the method comprising:
 a cross-linking step of mixing an acrylic copolymer including an epoxy group-containing (meth)acrylate unit, a thiol compound having 2 to 4 thiol groups per molecule, an amine compound, and an organic solvent to partially cross-link epoxy groups in the acrylic copolymer with the thiol compound and the amine compound;
 a coating preparation step of dissolving an epoxy resin in the organic solvent that contains the acrylic copolymer with the epoxy groups partially cross-linked and then dispersing an organic acid dihydrazide in the resultant organic solvent to thereby prepare a thermosetting adhesive layer-forming coating; and
 a thermosetting adhesive layer forming step of applying the thermosetting adhesive layer-forming coating to a base film and then drying the thermosetting adhesive layer-forming coating to thereby form a thermosetting adhesive layer.

8. A method of producing the thermosetting adhesive sheet, the method comprising:
 a step of preparing a dispersion containing an acrylic copolymer including an epoxy group-containing (meth)acrylate unit, an epoxy resin, a thiol compound having 2 to 4 thiol groups per molecule, an amine compound, and an organic solvent, the dispersion further containing an organic acid dihydrazide dispersed therein;
 a cross-linking step of partially cross-linking epoxy groups in the acrylic copolymer and the epoxy resin in the dispersion with the thiol compound and the amine compound; and
 a thermosetting adhesive layer forming step of preparing a partially cross-linked product by partially cross-linking the epoxy groups in the acrylic copolymer and the epoxy resin in the dispersion to serve as a thermosetting adhesive layer-forming coating, and applying the thermosetting adhesive layer-forming coating to a base film and then drying the applied thermosetting adhesive layer-forming coating to thereby form a thermosetting adhesive layer.

* * * * *